Patented June 17, 1941

2,246,285

UNITED STATES PATENT OFFICE 2,246,285

UNSATURATED ESTERS

Erving Arundale, Union, and Louis A. Mikeska, Westfield, N. J., assignors to Standard Oil Development Company, a corporation of Delaware No Drawing. Application December 1, 1939,
Serial No. 307,113

17 Claims. (Cl. 260—488)

The present invention relates to unsaturated esters and a process for producing the same. The esters of this invention are prepared from tertiary olefins or mixtures of such olefins with saturated hydrocarbons by condensing the tertiary olefins with formaldehyde and a substantially anhydrous organic acid (or its anhydride) in the presence of an anhydrous metal halide catalyst or a metal salt of a halogenated organic acid, the metal constituent of which is selected from the second or fourth group of the periodic table.

The tertiary olefins used in this reaction should have the general formula—

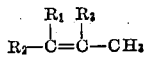

wherein $R_3$ is an unsubstituted or substituted alkyl, aryl, aralkyl, or alkaryl radical, and $R_1$ and $R_2$ are hydrogen atoms or any of the radicals mentioned above. Isobutylene, trimethyl ethylene, diisobutylene, 2-methyl pentene-2, etc., are examples of olefins useful in this reaction. The derivatives of tertiary olefins such as unsaturated ethers, unsaturated alcohols, and the like, may also be used as starting materials. Gaseous formaldehyde, paraformaldehyde, trioxymethylene, isomers of trioxymethylene, or any other compound which decomposes to yield anhydrous formaldehyde under the reaction conditions may be used as the source of formaldehyde in this reaction. The organic acid used should be at least 95% pure although the anhydrous reagent is to be preferred. Glacial acetic acid or acetic anhydride, propionic acid or its anhydride, crotonic acid, and phthalic acid or phthalic anhydride are representative examples of the acids and anhydrides which are useful in this reaction.

The condensations are catalyzed by inorganic metal halides and metal salts of halogenated organic acids, the metal constituents of which are selected from the second or fourth groups of the periodic table. Such catalysts include zinc chloride, stannic chloride, silicon tetrachloride, titanium tetrachloride, zinc dichloracetate, and the like. The catalyst employed should be of 95% purity or better, although the use of the anhydrous salt is preferable. The above catalysts do not polymerize the olefin being used under the reaction conditions employed.

The reaction may be carried out in the presence of inert solvents such as chloroform, ethylene dichloride, diethyl ether, and the like.

The tertiary olefin, formaldehyde, and acid condense in approximately equimolecular proportions so that the olefin-formaldehyde-acid molar ratio should be at least 1:1:1 for best results. The amount of catalyst used depends upon the nature of the catalyst, but usually ranges from 0.01 to 0.2 mol of catalyst per mol of formaldehyde. A larger amount may be used if desired. When the olefins used are liquids at room temperature, the reaction may be carried out in a closed vessel equipped with means for securing intimate contact between the reactants and the catalysts. However, when the olefins are vapors or highly volatile liquids at ordinary temperatures and pressures, a bomb or other container capable of retaining the vapors and providing efficient contact between the reactants and the catalyst must be used.

The reactions proceed readily at room temperature but may also be carried out at temperatures below or slightly above room temperature. Elevated temperatures are to be avoided because under such conditions polymerization and by-product formation become major reactions. The reaction proceeds best under anhydrous conditions and, in order to keep the reaction mixture substantially anhydrous, desiccants such as sodium sulfate, calcium sulfate, and the like may be used.

The unsaturated esters prepared by this process are novel. They are liquids boiling above 140° C., are insoluble in water, and have the general formula—

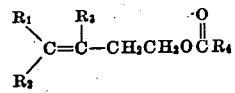

where $R_1$ and $R_2$ are hydrogen atoms or unsubstituted or substituted alkyl, aryl, aralkyl, or alkaryl radicals, $R_3$ and $R_4$ are unsubstituted or substituted, saturated or unsaturated hydrocarbon radicals. The reaction may be illustrated by the following equation for the condensation of isobutylene, formaldehyde, and glacial acetic acid to form isopropenyl ethyl acetate:

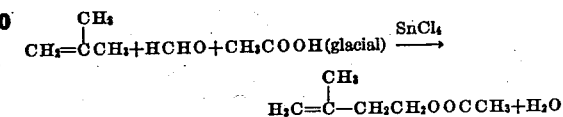

The unsaturated esters prepared by this process are useful as solvents, plasticizers, sources of unsaturated alcohols, and intermediates in the preparation of other useful chemical products.

The following examples are given for the purpose of illustrating the invention:

*Example 1*

250 parts of glacial acetic acid and 120 parts of para-formaldehyde were placed in a closed container equipped with a mechanical stirrer, and the mixture was stirred until a milky solution resulted. 60 parts of fuming stannic chloride were then added with stirring. The mixture was cooled to 20° C. and 285 parts of trimethyl ethylene were then added slowly. Some heat was evolved during this operation, but the temperature was kept below 35° C. by means of regulated cooling. The reaction was complete after 3 hours. Water was then added with stirring, and, when the stirring was stopped, two layers formed. Ether was added and the mixture was again thoroughly agitated. When the mixture was allowed to stand, two layers again formed, and the lower aqueous layer was removed. The remaining ether layer was washed with water and, finally, with a dilute potassium carbonate solution. The ether extract was then dried over sodium sulfate; the drying agent was subsequently separated by filtration, and the ether was removed from the filtrate by evaporation, yielding 394 parts of crude products. The product was fractionated to yield the sec-butenyl ethyl acetate,

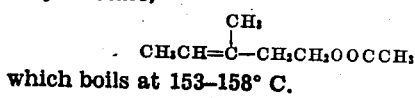

which boils at 153–158° C.

Example 2

500 parts of glacial acetic acid and 240 parts of trioxymethylene were placed in a closed container and stirred. 120 parts of fuming stannic chloride were then added. The milky mixture was cooled to 10° C. and gaseous isobutylene was slowly bubbled in with constant stirring and intermittent cooling. The temperature of the reaction mixture was maintained between 25° and 35° C. The reaction was complete in 3 hours. 312 parts of isobutylene were absorbed. The product was purified as described in Example 1. The pure isopropenyl ethyl acetate boiled at 142–145° C.

Example 3

220 parts of acetic anhydride and 120 parts of para formaldehyde were placed in a container and stirred. 60 parts of fuming stannic chloride were then added. The milky mixture was cooled to 20° C. and 285 parts of trimethyl ethylene were then added slowly with stirring. The temperature of the reaction mixture was maintained between 25° and 35° C. The reaction was complete in 3 hours. The unsaturated acetate produced sec-butenyl ethyl acetate, was purified as described in Example 1.

The above examples are given for illustrative purposes only and are not to be considered as limiting the invention.

What is claimed is:

1. A method of producing unsaturated esters of the general formula—

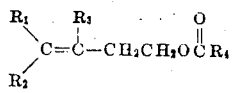

where $R_1$ and $R_2$ are selected from the group consisting of hydrogen atoms and alkyl, aryl, aralkyl and alkaryl radicals, $R_3$ is selected from the group consisting of alkyl, aryl, aralkyl and alkaryl radicals and $R_4$ is a hydrocarbon radical, which comprises condensing a tertiary olefin of the general formula—

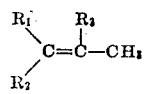

with formaldehyde and a compound selected from the group consisting of substantially anhydrous organic acids and their anhydrides in the presence of a catalyst selected from the group consisting of inorganic metal halides and metal salts of halogenated organic acids, the metal elements of which are chosen from the second and fourth groups of the periodic table.

2. A method of producing unsaturated esters of the general formula—

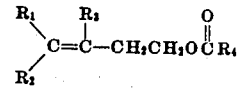

where $R_1$ and $R_2$ are selected from the group consisting of hydrogen atoms and alkyl, aryl, aralkyl and alkaryl radicals, $R_3$ is selected from the group consisting of alkyl, aryl, aralkyl and alkaryl radicals and $R_4$ is a hydrocarbon radical, which comprises condensing a tertiary olefin of the general formula—

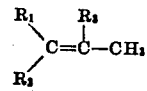

with formaldehyde and a compound selected from the group consisting of substantially anhydrous organic acids and their anhydrides in the presence of zinc chloride of 95–100% purity, and recovering the unsaturated esters.

3. A method of producing unsaturated esters of the general formula—

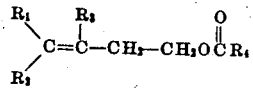

where $R_1$ and $R_2$ are selected from the group consisting of hydrogen atoms and alkyl, aryl, aralkyl and alkaryl radicals, $R_3$ is selected from the group consisting of alkyl, aryl, aralkyl and alkaryl radicals and $R_4$ is a hydrocarbon radical, which comprises condensing a tertiary olefin of the general formula—

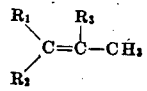

with formaldehyde and a compound selected from the group consisting of substantially anhydrous organic acids and their anhydrides in the presence of stannic chloride and recovering the unsaturated esters.

4. A method of producing unsaturated esters of the general formula—

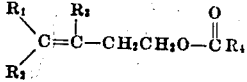

where $R_1$ and $R_2$ are selected from the group consisting of hydrogen atoms and alkyl, aryl, aralkyl and alkaryl radicals, $R_3$ is selected from the group consisting of alkyl, aryl, aralkyl and alkaryl radicals and $R_4$ is a hydrocarbon radical, which comprises condensing a tertiary olefin of the general formula—

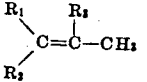

with formaldehyde and a compound selected from the group consisting of substantially anhydrous organic acids and their anhydrides in the presence of zinc dichloracetate and recovering the unsaturated esters.

5. The method of producing unsaturated acetates of the type—

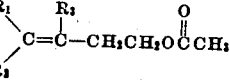

where $R_1$ and $R_2$ are selected from the group consisting of hydrogen atoms and alkyl, aryl, aralkyl and alkaryl radicals, and $R_3$ is selected from the group consisting of alkyl, aryl, aralkyl and alkaryl radicals, which comprises condensing a tertiary olefin of the general formula—

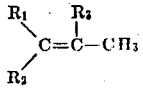

with formaldehyde and a compound selected from the group consisting of glacial acetic acid and its anhydride in the presence of a catalyst selected from the group comprising inorganic metal halides and metal salts of halogenated organic acids, the metal elements of which are selected from the second and fourth groups of the periodic table.

6. The method of producing unsaturated acetates of the type—

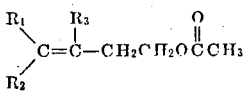

where $R_1$ and $R_2$ are selected from the group consisting of hydrogen atoms and alkyl, aryl, aralkyl and alkaryl radicals, and $R_3$ is selected from the group consisting of alkyl, aryl, aralkyl and alkaryl radicals, which comprises condensing a tertiary olefin of the general formula—

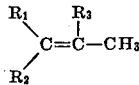

with formaldehyde and a compound selected from the group consisting of glacial acetic acid and its anhydride in the presence of stannic chloride, and recovering the unsaturated acetate.

7. The method of producing isopropenyl ethyl acetate which comprises condensing isobutylene with formaldehyde and glacial acetic acid in the presence of a catalyst selected from the group consisting of inorganic metal halides and metal salts of halogenated organic acids, the metal elements of which are selected from the second and fourth groups of the periodic table, and recovering the isopropenyl ethyl acetate.

8. The method of producing sec-butenyl ethyl acetate which comprises condensing trimethyl ethylene with formaldehyde and glacial acetic acid in the presence of a catalyst selected from the group consisting of inorganic metal halides and metal salts of halogenated organic acids, the metal elements of which are selected from the second and fourth groups of the periodic table, and recovering the sec-butenyl ethyl acetate.

9. The method of producing isopropenyl ethyl acetate which comprises condensing isobutylene with formaldehyde and glacial acetic acid in the presence of stannic chloride and recovering the isopropenyl ethyl acetate.

10. The method of producing isopropenyl ethyl acetate which comprises condensing isobutylene with formaldehyde and acetic anhydride in the presence of stannic chloride and recovering the isopropenyl ethyl acetate.

11. The method of producing sec-butenyl ethyl acetate which comprises condensing trimethyl ethylene with formaldehyde and glacial acetic acid in the presence of stannic chloride and recovering the sec-butenyl ethyl acetate.

12. A method of producing unsaturated esters of the general formula—

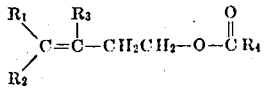

where $R_1$ and $R_2$ are selected from the group consisting of hydrogen atoms and alkyl, aryl, aralkyl, and alkaryl radicals, $R_3$ is selected from the group consisting of alkyl, aryl, aralkyl and alkaryl radicals and $R_4$ is a hydrocarbon radical, which comprises condensing a tertiary olefin of the general formula—

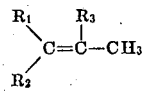

with approximately equimolecular proportions of formaldehyde and a compound selected from the group consisting of substantially anhydrous organic acids and their anhydrides at 0°–35° C., under the pressure generated by the reaction, and in the presence of 0.01–0.5 mol of a catalyst (per mol of formaldehyde) selected from the group consisting of inorganic metal halides and metal salts of halogenated organic acids, the metal elements of which are chosen from the second and fourth groups of the periodic table, and recovering the unsaturated esters.

13. The method of producing isopropenyl ethyl acetate which comprises condensing isobutylene with approximately equimolecular proportions of formaldehyde and glacial acetic acid at 20°–25° C., under the pressure generated by the reaction, with agitation, and in the presence of 0.01–0.5 mol of stannic chloride per mol of formaldehyde, diluting the mixture with water and thoroughly agitating, then adding ether and again agitating, separating the ether-ester layer, and recovering the isopropenyl ethyl acetate by evaporation of the ether.

14. As a composition of matter, an unsaturated ester of the general formula—

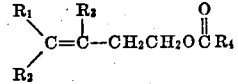

where $R_1$ and $R_2$ are selected from the group consisting of hydrogen atoms and alkyl, aryl, aralkyl and alkaryl radicals, $R_3$ is selected from the group consisting of alkyl, aryl, aralkyl and alkaryl radicals and $R_4$ is a hydrocarbon radical.

15. As a composition of matter, an unsaturated acetate of the general formula—

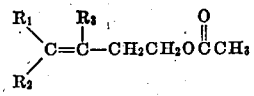

where $R_1$ and $R_2$ are selected from the group consisting of hydrogen atoms and alkyl, aryl, aralkyl and alkaryl radicals and $R_3$ is selected from the group consisting of alkyl, aryl, aralkyl and alkaryl radicals.

16. As a composition of matter, isopropenyl ethyl acetate.

17. As a composition of matter, sec-butenyl ethyl acetate.

ERVING ARUNDALE.
LOUIS A. MIKESKA.